3,470,027
THERMAL CELL
Niels C. Nielsen, Lexington, Ill., assignor to National Union Electric Corporation, Stamford, Conn., a corporation of Delaware
No Drawing. Filed Apr. 20, 1967, Ser. No. 632,216
Int. Cl. H01m 21/14, 11/00
U.S. Cl. 136—83                                    13 Claims

ABSTRACT OF THE DISCLOSURE

A thermal cell having as the fusible electrolyte a mixture of lithium, sodium, and potassium fluorides with a melting point not greater than 600° C. The eutectic mixture (46.5 mole percent LiF, 11.5 mole percent NaF, and 42.0 mole percent KF) melting at 454° C. is preferred. Any chemically compatible anode-cathode combination is used, e.g. a magnesium or lithium-magnesium-aluminum alloy anode and a $V_2O_5$ cathode. Lithium fluoride, sodium fluoride, potassium fluoride, or mixtures of the same may also be added to the cathode or to the cathode and the anode for improved cell life.

---

This invention relates to improvements in thermal cells and more particularly to a novel and improved electrolyte for use in thermal cells.

A thermal cell is an electrochemical power supply utilizing as the electrolyte an inorganic salt composition which is solid and nonconducting at ordinary temperatures. The cell is activated by heating it to a temperature sufficiently high to fuse or melt the electrolyte which thereby becomes conductive so that electrical energy may then be withdrawn from the system. A plurality of thermal cells may be connected and combined with a conventional heat generating source to provide a thermal battery characterized by long shelf life, ruggedness, and the ability to develop full voltage rapidly over a substantial range of ambient temperature.

A thermal cell has three major components: (1) the anode, which is oxidized during the electrochemical reaction; (2) the cathode (often called the "catholyte" or "depolarizer") which is reduced during the electrochemical reaction; and (3) the fusible electrolyte (often called the "anolyte").

The usual anode materials are magnesium and calcium, although others, including lithium and its alloys, have been investigated and reported. The common cathode materials ("depolarizers") are vanadium pentoxide (used with anodes of magnesium or lithium alloys) and calcium chromate (used with a calcium anode). A eutectic mixture of lithium chloride and potassium chloride, with a nominal melting point of about 354° C., has been the fusible electrolyte used heretofore in all practical thermal cells.

Various designs and electrochemical systems are known for use in thermal cells. For example, the article "Thermal Batteries," by Robert B. Goodrich and Richard C. Evans, J. Electrochem. Soc., 99, 207C (1952), describes a thermal cell assembly utilizing sheet calcium anodes, nickel screen cathodes coated with a fused layer of 80% tungstic oxide and 20% lead chromate, and glass cloth electrolyte carriers impregnated with a salt composition containing 55% potassium chloride and 45% lithium chloride. Other designs and electrochemical systems are disclosed, for example, in the following U.S. patents: John H. Zauner, 2,999,122, issued Sept. 5, 1961; Isador D. Yalom et al., 3,055,960, issued Sept. 25, 1962; Laurence P. McGinnis, 3,079,454, issued Feb. 26, 1963; Glenn F. Zellhoefer, 3,110,632, issued Nov. 12, 1963; Lyle H. Raper, 3,116,173, issued Dec. 31, 1963; Richard E. Panzer, 3,117,032, issued Jan. 7, 1964; William C. Spindler, 3,160,531, issued Dec. 8, 1964; Richard E. Panzer, 3,189,485, issued June 15, 1965; Joseph C. Jerome, 3,194,686, issued July 13, 1965; Terrence J. Kurtzweil et al., 3,201,278, issued Aug. 17, 1965; and Edward M. Klopp et al., 3,258,365, issued June 28, 1966.

The electromotive force or voltage of a thermal cell has been considered to be a function primarily of the anode/cathode couple employed in a particular cell. For example, the voltage for the magnesium/vanadium pentoxide couple is a nominal 2.9 volts; the voltage of the lithium alloy/vanadium pentoxide couple is a nominal 3.3 volts; and the voltage of the calcium/calcium chromate couple is a nominal 2.7 volts. Heretofore, it has not been reported that the electrolyte composition of the cell has any significant effect on the nominal voltage of the cell. However, I have now discovered that a novel electrolyte composition in a thermal cell provides an unexpected increase in the cell voltage and energy density with other attendant advantages.

Accordingly, a primary object of the invention is to provide a novel and improved thermal cell characterized by an unexpectedly high voltage and energy density.

A further object of the invention is to provide a novel and improved thermal cell in which the aforementioned improvements are obtained by utilizing a novel electrolyte composition.

Another object of the invention is to provide a novel and improved thermal cell of the foregoing type which is also characterized by improved cell life and the ability to operate at higher temperatures.

The foregoing objects of the invention are realized by means of a novel fusible electrolyte composition comprising a mixture of lithium, sodium, and potassium fluorides. The preferred composition is the eutectic mixture melting at about 454° C. and comprising about 46.5 mole percent lithium fluoride, about 11.5 mole percent sodium fluoride, and about 42.0 mole percent potassium fluoride. Other proportions of these components may also be utilized without departing from the scope of the invention, but it will generally be desirable to utilize a mixture having a melting point not in excess of about 600° C. Compositions falling within this limit can readily be determined from the ternary phase diagram, e.g. as disclosed at page 230 of "Phase Diagrams for Ceramists" by E. M. Levine et al., published by The American Ceramic Society (1956). Examples of compositions within the scope of the invention but melting at about 600° C. are as follows:

|     | Mole percent | Mole percent |
| --- | --- | --- |
| LiF | 56.4 | 26.5 |
| NaF | 27.6 | 22.5 |
| KF  | 16.0 | 51.0 |

The choice of a particular lithium fluoride-sodium fluoride-potassium fluoride composition will be limited only by the ability of all the materials comprising the thermal cell to tolerate the heat required to fuse the selected electrolyte composition. As will be understood, the electrolyte is normally used in combination with a suitable binder such as kaolin.

In general, the novel fusible electrolyte of the present invention may be used in conjunction with any anode-cathode combination which is chemically compatible with the electrolyte. In other words, the anode and cathode must be selected so as to avoid excessive or detrimental side reactions with the electrolyte. Preferably, the anode of the cell comprises magnesium or a lithium alloy. The preferred lithium alloys are lithium-aluminum-magnesium alloys, particularly those containing from about 10 wt. percent to about 20 wt. percent lithium, from about 1 wt. percent to about 6 wt. percent aluminum, and the balance essentially magnesium. A particularly useful alloy is LA 141A containing about 15 wt. percent lithium, about 3 wt. percent aluminum, and about 82 wt. percent magnesium. The preferred cathode (or "depolarizer") is vanadium pentoxide which will usually be present in the form of a mixture of vanadium pentoxide with a fusible electrolyte material, particularly an alkali metal halide such as lithium fluoride or a lithium chloride-potassium chloride eutectic mixture. However, it is preferred to use a lithium fluoride-sodium fluoride-potassium fluoride mixture of the type disclosed above. Also, the cathode of the cell is normally in contact with a cathode collector such as a nickel disk coated with a fused glass composition such as $V_2O_5$ and $B_2O_3$.

The use in a thermal cell of the novel fusible electrolyte composition described above results in a significant increase in the voltage and energy density obtained from the cell as compared with the use of a conventional electrolyte such as a eutectic mixture of lithium chloride and potassium chloride. For example, in an electrochemical system utilizing a magnesium/vanadium pentoxide couple or a lithium alloy/vanadium pentoxide couple, the substitution of the fusible electrolyte composition of the present invention results in an increase of 15% or greater in the cell voltage. Thus, a thermal battery comprising seven cells utilizing as the electrolyte the lithium fluoride-sodium fluoride-potassium fluoride eutectic mixture of the present invention produced an average open circuit voltage of 3.34 volts per cell as compared with 2.9 volts per cell for a similar battery using the conventional lithium chloride-potassium chloride eutectic mixture. As mentioned above, this is quite an unexpected result since past experience in this field has indicated that the voltage of the cell is determined primarily by the choice of anode/cathode couple and is not appreciably affected by changing the electrolyte composition.

Although the practice of the present invention requires a departure from the usual electrolyte compositions, it does not require any changes in the known methods for the preparation of thermal cells and batteries. For example, the conventional layered or pelletized construction may be employed wherein the individual thermal cell comprises a multiple layer pellet prepared by compressing the anode, electrolyte, and cathode materials in powdered or granular form. In a typical configuration, each pellet has a three-layer construction consisting of the anode, electrolyte, and cathode. In another known configuration, the cell may be prepared as a two-layer pellet consisting of the electrolyte and cathode formed from powdered materials, and the anode of the cell is attached as a preformed metal sheet. Other methods of cell construction are known from the previously listed prior art patents. In the construction of a thermal battery comprising a plurality of interconnected thermal cells, it will be understood by those skilled in the art that an integral heat source must also be incorporated in the battery. For example, conventional heat paper or heat pads may be utilized such as disclosed in U.S. Patents Nos. 3,055,960 and 3,194,686.

When the novel fusible electrolyte system of the present invention is employed, additional advantages are also obtained by including in the cathode composition a minor amount, namely, from about 10 wt. percent to about 40 wt. percent, of lithium fluoride, sodium fluoride, potassium fluoride, or mixtures of the same. I have found that the presence of a fluoride in the cathode composition results in increased operating life of the thermal cell in addition to the higher voltage and energy density attributable to the use of the lithium fluoride-sodium fluoride-potassium fluoride as the main electrolyte of the system. If desired, one of the aforementioned fluorides or a mixture of the same may also be included in the anode composition with the result that better thermal conductivity and heat distribution are provided, resistance to "heat shock" is improved, and maximum performance of the cell is achieved by providing a continuum of fluoride ions throughout the entire system. Although the addition of a fluoride to the cathode composition or to the cathode and anode compositions is desirable in order to gain the attendant advantages just described, it should be understood that the invention is not so limited and that the primary advantage of increased cell voltage and energy density is obtained by the use of the novel lithium fluoride-sodium fluoride-potassium fluoride electrolyte.

To obtain the auxiliary benefits described above, lithium fluoride is a highly effective additive to the cathode composition. For example, the inclusion of from about 10 wt. percent to about 40 wt. percent of lithium fluoride in a vanadium pentoxide cathode composition results in a substantial improvement in cell life. Instead of lithium fluoride as the additive, I may also use the same lithium fluoride-sodium fluoride-potassium fluoride mixture disclosed above as the main electrolyte composition of the system. The actual quantity of fluoride material added to the cathode or to the cathode and anode may vary within relatively wide limits and may be selected to optimize other cell characteristics, such as activation time or internal impedance.

The following specific examples are presented to illustrate further the principles of the invention but are not to be construed as limiting examples.

Example 1

For purposes of comparison, a thermal cell was prepared utilizing the conventional potassium chloride-lithium chloride eutectic mixture as the electrolyte. The cell had a pelletized three-layer construction, and nickel disks with electrical leads were attached to the anode and cathode sides of the cell to obtain the desired electrical data. Activation of the cell was achieved by placing the cell between two heavy metal plates which were heated to the desired temperature. Standard equipment was used to impose a load on the cell and to read the voltages which were produced. The electrochemical components of the system were as follows:

Anode: 90 wt. percent magnesium powder and 10 wt. percent lithium fluoride;

Electrolyte: a eutectic mixture of lithium chloride and potassium chloride plus a binder; and Cathode: vanadium pentoxide plus lithium fluoride in the ratio of 10:3 by weight with a vanadium pentoxide-boric oxide glass present on the nickel disk comprising the cathode collector.

The diameter of the cell was 1.781 inches.

When this cell was heated to 455° C., the open circuit voltage ranged from 2.80 to 2.90 volts. When a load of 5 ohms was placed across the cell, a peak voltage ranging from 2.76 to 2.82 volts was obtained.

Example 2

A thermal cell similar to that of Example 1 was prepared except that a eutectic mixture of lithium fluoride, sodium fluoride, and potassium fluoride was substituted as the electrolyte. In order to minimize the possible effect of other components on the performance of the cell, the lithium fluoride used in the anode of Example 1 was omitted and the vanadium pentoxide cathode was prepared using the conventional lithium chloride-potassium chloride eutectic mixture instead of the lithium fluoride used in Example 1. Thus, the electrochemical components of the cell were as follows:

Anode: magnesium powder;

Electrolyte: a eutectic mixture of lithium fluoride, sodium fluoride, and potassium fluoride plus a binder; and Cathode: vanadium pentoxide and lithium chloride-potassium chloride eutectic mixture in the ratio of 5:3 by weight.

A glass coated cathode collector was used as in Example 1 and the cell diameter was the same as in Example 1.

When the cell was heated to 500° C., an open circuit voltage ranging from 3.20 to 3.57 volts was obtained. The peak voltage under a load of 5 ohms ranged from 3.10 to 3.43 volts. Thus, a substantial improvement in performance was obtained as compared with Example 1 and such improvement was attributable to the use of the specified mixture of fluorides as the electrolyte of the system.

Example 3

In this case, a thermal cell was prepared as a two-layer pellet with a solid metal anode disk approximately 0.015 inch in thickness. Also, a different anode composition and a different cathode composition were used as compared with Example 2. The electrochemical components of the system were as follows:

Anode: solid sheet of lithium alloy LA 141A (15 wt. percent Li; 3 wt. percent Al, and 82 wt. percent Mg);

Electrolyte: a eutectic mixture of lithium fluoride, sodium fluoride, and potassium fluoride plus a binder; and Cathode: vanadium pentoxide and lithium fluoride in the ratio of 5:3 by weight.

When the cell was heated to 500° C., the open circuit voltage ranged from 3.56 to 3.60 volts. Peak voltage under a load of 3.80 ohms was 3.8 volts, and peak voltage with a load of 5 ohms ranged from 3.30 to 3.36 volts.

Example 4

A three-layer pelletized cell was prepared similar to Example 2 except that lithium fluoride was added to the magnesium powder anode and lithium fluoride was substituted as the electrolyte ingredient of the vanadium pentoxide cathode mixture. The electrochemical components were as follows:

Anode: magnesium and lithium fluoride powders in the ratio of 7:3 by weight;

Electrolyte: a eutectic mixture of lithium fluoride, sodium fluoride, and potassium fluoride plus a binder; and Cathode: vanadium pentoxide and lithium fluoride in the ratio of 5:3 by weight.

The same glass coated cathode collector was used, but the cell diameter in this case was 1.914 inches.

When the cell was heated to a temperature of from 525° C. to 600° C., an open circuit voltage of from 3.24 to 3.29 volts was obtained. At a load of 96.4 ohms, the peak voltage was 3.00 volts. At a load of 191 ohms the peak voltage ranged from 3.16 volts to 3.24 volts.

Example 5

A three-layer pelletized construction was used similar to Examples 2 and 4, and the electrochemical system was the same as in Example 2 except that the vanadium pentoxide cathode material was mixed with the fluoride eutectic mixture instead of the lithium chloride-potassium chloride eutectic used in Example 2. The complete electrochemical components were as follows:

Anode: magnesium powder;

Electrolyte: a eutectic mixture of lithium fluoride, sodium fluoride, and potassium fluoride plus a binder; and Cathode: vanadium pentoxide and a LiF-NaF-KF eutectic mixture in the ratio of 5:3 by weight.

The glass coated cathode collector and the cell diameter were the same as in Example 2.

When the cell was activated at a temperature of 500° C., the open circuit votage was 3.34 volts. Under a load of 5.6 ohms, the peak voltage of the cell was 3.20 volts.

Example 6

A three-layer pelletized cell was prepared similar to that of Example 5 except that the magnesium powder anode was mixed with a minor amount of the fluoride eutectic mixture. The electrochemical components were as follows:

Anode: magnesium powder and a LiF-NaF-KL eutectic mixture in the ratio of 7:3 by weight;

Electrolyte: a eutectic mixture of lithium fluoride, sodium fluoride, and potassium fluoride plus a binder; and Cathode: vanadium pentoxide and a LiF-NaF-KF eutectic mixture in the ratio of 5:3 by weight.

The glass coated cathode collector and the cell diameter were the same as in Examples 2 and 5.

When activated at a temperature of 500° C., the open circuit voltage of the cell was 3.49 volts. Under a load of 5.16 ohms the peak voltage of the cell was 3.15 volts.

I claim:

1. A thermal cell comprising an anode metal selected from the group consisting of (a) magnesium, and (b) a lithium alloy; a vanadium pentoxide cathode; and a fusible salt electrolyte consisting of a mixture of lithium fluoride, sodium fluoride, and potassium fluoride.

2. A thermal cell as defined in claim 1 further characterized in that said mixture has a melting point not in excess of about 600° C.

3. A thermal cell as defined in claim 1 further characterized in that said mixture is a eutectic mixture comprising about 46.5 mole percent lithium fluoride, about 11.5 mole percent sodium fluoride, and about 42.0 mole percent potassium fluoride.

4. A thermal cell as defined in claim 1 further characterized in that said lithium alloy contains from about 10 wt. percent to about 20 wt. percent lithium, from about 1 wt. percent to about 6 wt. percent aluminum, and the balance essentially magnesium.

5. A thermal cell as defined in claim 4 further characterized in that said lithium alloy comprises about 15 wt. percent lithium, about 3 wt. percent aluminum, and about 82 wt. percent magnesium.

6. A thermal cell as defined in claim 1 further characterized in that said cathode comprises vanadium pentoxide and a fluoride selected from the group consisting of lithium fluoride, sodium fluoride, potassium fluoride, and mixtures of the same.

7. A thermal cell as defined in claim 6 further characterized in that said anode also contains a fluoride selected from the group consisting of lithium fluoride, sodium fluoride, potassium fluoride, and mixtures of the same.

8. A thermal cell as defined in claim 1 further characterized in that said anode comprises magnesium, said cathode comprises vanadium pentoxide, and said electrolyte is a eutectic mixture of lithium fluoride, sodium fluoride, and potassium fluoride.

9. A thermal cell as defined in claim 8 further characterized in that said cathode comprises vanadium pentoxide and a fluoride selected from the group consisting of lithium fluoride and a eutectic mixture of lithium fluoride, sodium fluoride, and potassim fluoride.

10. A thermal cell as defined in claim 9 further characterized in that said anode comprises magnesium and a fluoride selected from the group consisting of lithium fluoride and a eutectic mixture of lithium fluoride, sodium fluoride, and potassium fluoride.

11. A thermal cell as defined in claim 8 further characterized in that said anode comprises an alloy of lithium, aluminum, and magnesium.

12. In a thermal battery comprising at least one thermal cell and an integral heat source, wherein said thermal cell comprises an anode metal selected from the group consisting of (a) magnesium, and (b) a lithium alloy; a vanadium pentoxide cathode; and a fusible salt electrolyte; the improvement wherein said electrolyte consists of a mixture of lithium fluoride, sodium fluoride, and potassium fluoride.

13. A thermal battery as defined in claim 12 further characterized in that said mixture is a eutectic mixture containing about 46.5 mole percent lithium fluoride, about 11.5 mole percent sodium fluoride, and about 42.0 mole percent potassium fluoride.

References Cited
UNITED STATES PATENTS

| | | | |
|---|---|---|---|
| 3,033,910 | 5/1962 | McCallum et al. | 136—120 |
| 3,160,531 | 12/1964 | Spindler | 136—120 |
| 3,189,485 | 6/1965 | Panzer | 136—83 |
| 3,238,437 | 3/1966 | Foster et al. | 136—83 |
| 3,338,749 | 8/1967 | Johnson et al. | 136—120 |
| 3,345,214 | 10/1967 | Zauner et al. | 136—83 |
| 3,361,596 | 1/1968 | Senderoff et al. | 136—83 |
| 3,367,800 | 2/1968 | Panzer | 136—83 |
| 3,099,587 | 7/1963 | Chambers et al. | 136—86 |

FOREIGN PATENTS 624,176  7/1961  Canada.

WINSTON A. DOUGLAS, Primary Examiner

C. F. LEFEVOUR, Assistant Examiner

U.S. Cl. X.R.

136—120, 153